July 19, 1949.  D. B. GARDINER  2,476,720
FLOW REGULATING VALVE
Filed June 18, 1945
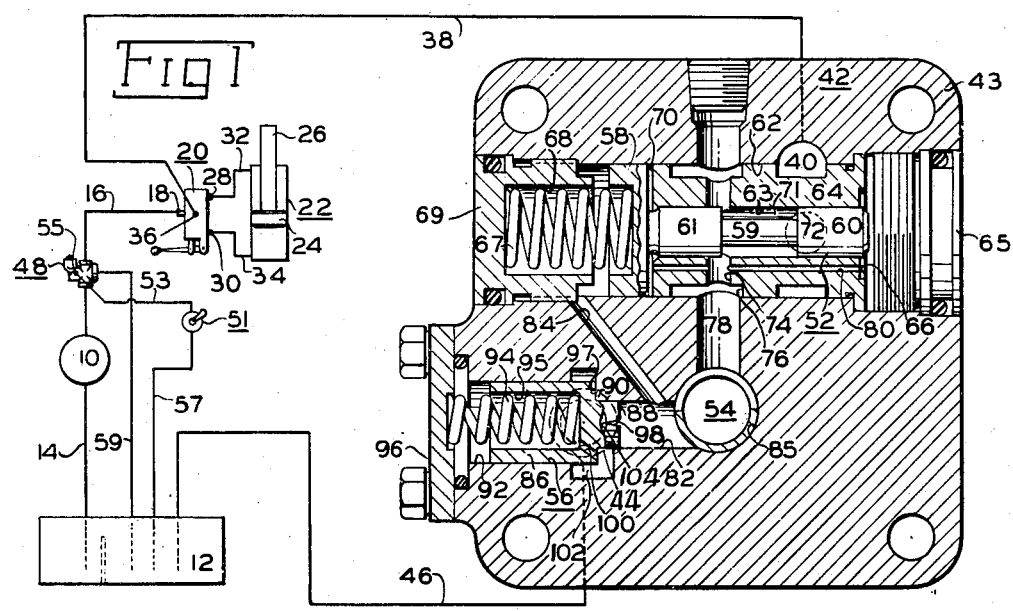
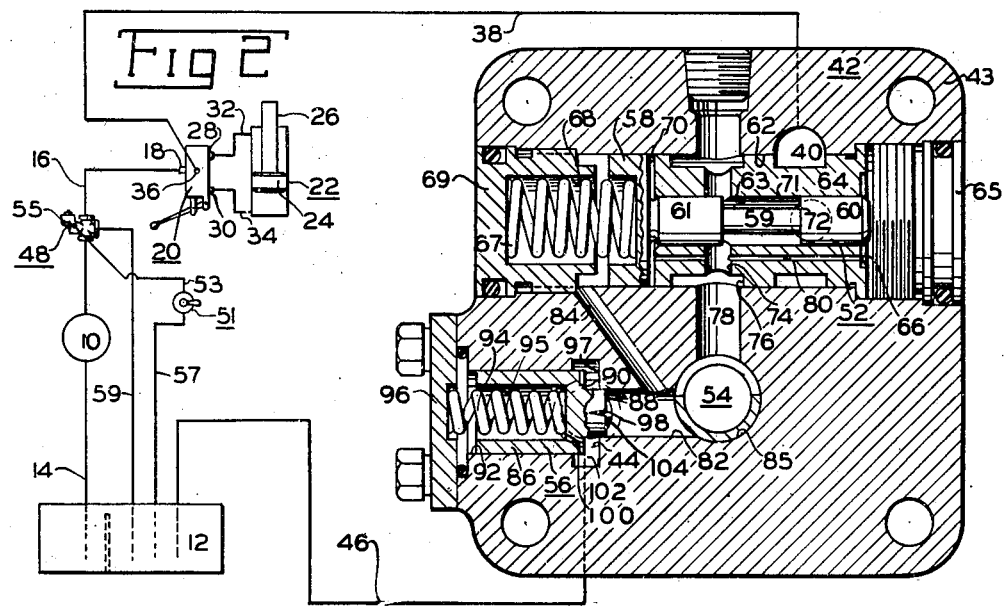
INVENTOR.
DUNCAN B. GARDINER
BY
Ralph R. Tweedale
ATTORNEY Patented July 19, 1949

2,476,720

UNITED STATES PATENT OFFICE 2,476,720

FLOW REGULATING VALVE

Duncan B. Gardiner, Detroit, Mich., assignor to Vickers Incorporated, Detroit, Mich., a corporation of Michigan Application June 18, 1945, Serial No. 600,001

17 Claims. (Cl. 60—52)

This invention relates to power transmissions, particularly to those of the type comprising two or more fluid pressure energy translating devices, one of which may function as a pump and another as a fluid motor.

In particular, the invention relates to an improvement in a flow-regulating valve comprising an adjustable throttle and a compensating valve for maintaining a constant flow across the throttle through which fluid is adapted to flow at a regulated rate regardless of load resistance.

Flow-regulating valves have an important use in hydraulic power transmissions for driving machine tools. They serve the purpose of producing a reduced speed rate of the machine tool, and the machine tool may be driven at a constant regulated rate of speed regardless of load resistance.

In the past some difficulty was presented in preventing motor jump when the motor was started after interruption and in particular when a machine tool slide was moved into a feed position from rest or where there was a resumption of a feed movement after interruption during a slide movement. In many cases, if a feed movement was interrupted and the operator of the machine tool did not back the tool away from the work before resuming a cut, the tool was ruined. This is due to the fact that, when flow through the flow-regulating valve is interrupted, the compensating valve is held to the fully open position by a compensating valve spring. When flow is resumed after interruption, a temporary flow of fluid above the normal regulated rate passes through the fully open compensating valve before it is able to assume normal regulating position. Although this is only a momentary lapse and the compensating valve almost immediately assumes normal regulating position, this temporary flow of fluid above the normal regulated rate causes the motor to jump slightly before a constant regulated movement begins and ruins a cutting tool.

In the past this difficulty has been avoided by the addition of valves incorporated in the transmission to induce a flow through the flow-regulating valve when flow to the motor was interrupted, thereby placing the compensating valve already in a position to regulate normally when flow to the motor was resumed. This necessitated additional valves, lines and fittings in the hydraulic transmission.

It is an object of this invention to provide an improved flow-regulating valve for use in a hydraulic transmission containing a fluid pump and motor which will prevent motor jump when flow is resumed through the flow-regulating valve after interruption.

It is also an object of this invention to provide a flow-regulating valve which will prevent motor jump when flow is resumed through the flow-regulating valve after interruption by preventing a flow above the normal regulated rate before the compensating valve assumes regulating position.

It is also an object of this invention to incorporate in combination with an adjustable throttle and compensating valve, comprising a flow-regulating valve, a blocking valve to gradually permit a flow of fluid up to the normal regulated rate when the motor is started after interruption and until the compensating valve assumes flow-regulating position.

It is a further object of this invention to provide an improved flow-regulating valve which will prevent motor jump when flow is resumed through the flow-regulating valve after interruption which may be economically manufactured, simple in operation, and which avoids the addition to the hydraulic transmission of extra valves, lines or fittings.

Further objects and advantages of the present invention will be apparent from the following description, reference being had to the accompanying drawing wherein a preferred form of the present invention is clearly shown.

In the drawing:

Figure 1 is a diagrammatic view of a hydraulic power transmission system incorporating a preferred form of the present invention in the closed position.

Figure 2 is a diagrammatic view of the same hydraulic power transmission system shown in Figure 1 incorporating a preferred form of the present invention in a partially opened position.

Referring now to Figure 1, there is shown a pump 10, which may be driven by an electric motor, not shown, which is supplied with fluid from a tank 12 by means of a suction conduit 14 and which has a pump delivery conduit 16 connected to the pressure port 18 of a suitable four-way directional valve 20. A motor 22 having a piston 24 and a piston rod 26 is connected to cylinder ports 28 and 30 of valve 20 by means of a conduit 32 connected to the rod end and a conduit 34 connected to the head end of said motor. A tank port 36 of valve 20 is connected by means of a conduit 38 to an inlet port 40 of a flow-regulating valve 42. Valve 42 also has an outlet port 44 which is connected to tank 12 by means of a conduit 46.

A suitable relief valve 48 may be provided in the pump delivery conduit 16 and is preferably constructed in accordance with the disclosure of the patent to Harry F. Vickers, No. 2,043,453. Valves of this character may be provided with a venting port for venting the control chamber in order to permit the main valve to act as an unloading valve and bypass the pump delivery at negligible pressure. A suitable, manually-controlled, two-way control valve 51 is connected by means of a conduit 53 to a venting port 55 of valve 48 and to tank 12 by means of a conduit 57. In one position, valve 51 will close venting port 55 and permit fluid from pump 10 to enter valve 20 which directs it to motor 22 to start said motor, while in another position valve 51 will open venting port 55 to tank 12 by means of conduits 53 and 57, permitting valve 48 to open completely and unload pump 10 to tank 12 by means of an exhaust conduit 59, thus stopping motor 22. Relief valve 48 also serves as a safety factor in limiting the maximum pressure attainable in the system, and cooperates with flow-regulating valve 42 in exhausting to tank 12 any amount of fluid from pump 10 in excess of which flow-regulating valve 42 is adjusted to pass.

Flow-regulating valve 42 is comprised of a body 43 in which is contained a compensating valve 52, an adjustable throttle 54 and a blocking valve 56. Compensating valve 52 is comprised of a hollow piston 58 connected to which is a stem 59 provided with lands 60 and 61. Piston 58 is shiftable within a longitudinal stepped bore 62 extending completely across body 43, and stem 59 is shiftable within a longitudinal bore 63 extending the full length of a sleeve 64 which is tightly inserted in bore 62. A hollow plug 65 threaded into the right end of bore 62 forms a chamber 66 in bore 62 between sleeve 64 and plug 65 and also limits rightward movement of compensating valve 52. A spring 67 of predetermined resistance is located in a spring chamber 68 formed in bore 62 between piston 58 and a hollow plug 69 which is threaded into the left end of bore 62. A chamber 70 is formed in bore 62 between the left end of sleeve 64 and the right side of piston 58.

Inlet port 40 is in communication with an inlet chamber 71 formed in bore 63 of sleeve 64 between lands 60 and 61 by means of an inlet passage 72. Inlet chamber 71 is in communication with the throttle 54 by means of a passage 74 and a groove 76 in sleeve 64 and a passage 78. A longitudinal drilled passageway 80 extending the full length of sleeve 64 and which intersects passage 74 forms a means of communication between inlet chamber 71 and chambers 66 and 70. A passage 82 connecting throttle 54 with blocking valve 56 has a branch passage 84 in communication with spring chamber 68. Adjustable throttle 54 is rotatably mounted in a bore 85 which intersects passages 78 and 82 and serves as an adjustable restriction to flow from passage 78 to passage 82. Spring 67 normally biases compensating valve 52 to the open position so that land 60 permits communication between inlet passage 72 and inlet chamber 71.

Blocking valve 56 is comprised of a hollow piston 86 having a projecting portion 88 which forms a shoulder 90. Piston 86 is shiftable within a stepped bore 92 which is in communication with passage 82, and its projecting portion 88 is shiftable within passage 82. A spring 94 of predetermined resistance is located in a spring chamber 95 formed in the hollow portion of piston 86. A plate 96 bolted to valve 42 encloses piston 86 completely within bore 92 and passage 82. Spring 94 normally positions piston 86 in bore 92 and passage 82 so that shoulder 90 of piston 86 abuts a shoulder 91 of bore 92 and so that an outlet passage 104 in communication with outlet port 44 is blocked from communication with passage 78. The inlet and outlet ports 40 and 44 are preferably located at the back of the body 43 and arranged for connection to the circuit lines by suitable "panel mounting" connections such, for example, as are described in the Martin Patent No. 2,204,507. Piston 86 has a triangular slot 98 at the extreme right end of its projecting portion 88 and also has a restricted passage 100 which connects spring chamber 95 of piston 86 with a chamber 102 of bore 92.

Referring now to Figure 1, in operation with the electric motor operating pump 10 and with control valve 51 in the open position so as to direct full pump flow from conduit 16 to tank 12 and with motor 22 stopped, compensating valve 52 will be in the open position shown. When fluid flow is thus directed from pump 10 to tank 12 to stop motor 22, fluid flow ceases through flow-regulating valve 42, and spring 67 will shift piston 58 and stem 59 to the right.

When control valve 51 is shifted to close venting port 55 in order to start motor 22, and with directional valve 20 shifted so as to connect conduit 16 with conduit 34 and conduit 32 with conduct 38 so as to direct pump delivery to the head end of motor 22, fluid will be delivered by pump 10 through conduit 16, ports 18 and 30 of valve 20 and conduit 34 to the head end of motor 22. Discharging fluid from the rod end of motor 22 may enter conduit 32, ports 28 and 36 of valve 22 and by means of conduit 38 flow to the inlet port 40 of valve 42. Due to the fact that compensating valve 52 is in the open position, land 60 permits fluid to enter from inlet passage 72, in communication with inlet port 40, to inlet chamber 71 and from there by means of passage 74, groove 76, passage 78, throttle 54 and passage 82 to blocking valve 56, at which point a pressure increase occurs because piston 86 is blocking the discharged fluid from motor 22 through outlet passage 104.

When there is a sufficient pressure increase in passage 82, which is almost instantaneous, the resistance of spring 94 is overcome, and piston 86 will begin to shift to the left. Due to the fact that the apex portion of triangular slot 98 breaks over outlet passage 104 first, only a small amount of fluid is discharged through outlet passage 104, outlet port 44 and conduit 46 to tank 12. In addition, a dashpot action will be provided by restricted passage 100 in piston 86 which permits only a small amount of fluid to leave spring chamber 95 of valve 56. As the operation of compensating valve 52 depends upon a pressure drop across throttle 54 equivalent to the pressure setting of spring 67, compensating valve 52 will not begin to close. As fluid flow continues, piston 86 will continue to shift to the left to permit a gradually increasing flow of fluid to discharge through outlet passage 104.

As is shown in Figure 2, piston 86, by a continued but slow shifting to the left because of the dashpot reaction provided by restricted passage 100, has partially opened outlet passage 104. Compensating valve 52 is still in the open position because the flow is so small that the pressure drop across throttle 54 up to this point has not exceeded the resistance of spring 67. However, as the flow increases, the pressure drop through throttle 54 increases, and the net force acting on opposite sides of piston 58 approaches the value of the force of spring 67.

At this point, shown in Figure 2, a continued movement of piston 86 to the left will create an opening in outlet passage 104 equivalent to the opening in throttle 54 which will create a pressure drop across throttle 54 equivalent to the resistance of spring 67, and fluid pressure in chamber 70 will start to shift piston 58 to the left which will create a smaller inlet for fluid in inlet passage 72. By the time piston 86 has completely opened outlet passage 104, compensating valve 52 has partially closed and is in a position to assume its normal regulating function.

The purpose of compensating valve 52, which is well known in the prior art, is to maintain a constant flow across throttle 54, and it accomplishes this by maintaining a constant pressure in inlet chamber 71. Compensating valve 52 is responsive to the pressure drop across throttle 54, and, when the pressure drop across throttle 54 slightly exceeds the resistance offered by spring 67, compensating valve 52 will shift to the left to partially close inlet passage 72 to inlet chamber 71 so as to allow just enough fluid inflow to maintain the pressure in inlet chamber 71 at a constant increment above that in passage 82. Pressure fluid entering inlet chamber 71 also enters chamber 70 by means of passage 74 and passage 80 where it acts against the right side of piston 58 and by passage 86 to chamber 66 where it acts against land 60. Fluid pressure crossing throttle 54 into passage 82 also enters chamber 68 by means of passage 84 where it acts against the left side of piston 58. An increase of pressure in inlet chamber 71 sufficient to overcome the resistance of spring 67 will cause compensating valve 52 to shift to the left so that land 60 will tend to close passage 72 to inlet chamber 71 to allow just enough fluid to enter inlet chamber 71 to maintain constant the pressure drop across throttle 54. The flow across throttle 54 will be uniformly constant so that piston 24 of motor 22 will move at a uniformly constant rate of speed.

Throttle 54 is originally adjusted to pass a certain flow of fluid, the amount of which, naturally, will be less than pump capacity. The excess amount of fluid from pump 10 over the flow through valve 42 is exhausted to tank 12 by means of relief valve 46.

If it were not for blocking valve 56, when motor 22 was started, the discharged fluid from motor 22 would have a free outlet through the fully open compensating valve 52 to tank 12 until compensating valve 52 could assume the flow-regulating position. An amount of fluid more than the normal regulated rate that compensating valve 52 would ordinarily allow to pass would be discharged to tank during this lapse, and piston 24 of motor 22 would move much faster for a short distance than is allowable. Blocking valve 56, by permitting a gradually increasing flow of fluid through outlet passage 104 to tank 12, but always below the amount that compensating valve 52 would allow to pass provided it was in flow-regulating position when the motor was started, thus prevents a flow of fluid above the normal regulated rate and thereby prevents motor jump when flow is resumed through flow regulating valve 42 after interruption.

If motor 22 is stopped and then restarted in the other direction by means of shifting valve 20 to connect conduit 16 to conduit 32 and conduit 34 to conduit 38, blocking valve 56 will perform the same function in the same way, as discharged fluid from the piston end of motor 22 must pass through flow-regulating valve 42.

It should be noted that, if at any time flow through the flow-regulating valve 42 should completely cease, in spite of the compensating valve 52 moving to the fully open position by the action of spring 67, blocking valve 56 will shift to the closed position by reason of spring 94. Thus, when flow through the flow-regulating valve 42 is resumed, a temporary flow of fluid through the open compensating valve 52 above the normal regulated rate is prevented.

It should also be noted that blocking valve 56 permits a gradually increasing flow of fluid, but never more than the normal regulated rate, when flow is resumed after interruption through flow-regulating valve 42. Triangular opening 98 of piston 86 first breaks over outlet passage 104, and, as piston 86 continues to shift to the left, outlet passage 104 slowly and gradually opens because of the dashpot action provided by restricted passage 100 in piston 86. Before piston 86 has shifted completely, piston 58 of valve 52 acted upon by pressure in chamber 70 will have started to shift which moves land 60 over inlet passage 72 at which time compensating valve 52 is in a position to assume its normal regulating operation.

Compensating valve 52, when in a normal regulating position, is never fully open or fully closed. Once compensating valve 52 assumes normal regulating position when flow is resumed after interruption, blocking valve 56 does not in any way interfere with the normal operation of compensating valve 52 and throttle 54.

While the form of embodiment of the invention as herein disclosed constitutes a preferred form, it is to be understood that other forms might be adopted, all coming within the scope of the claims which follow.

What is claimed is as follows:

1. A flow-regulating valve for controlling flow in hydraulic power transmission systems comprising in combination, an adjustable throttle through which fluid is adapted to flow at a normal regulated rate, a pressure compensating valve responsive to the pressure drop across the throttle for maintaining the normal regulated rate and being of the type which is normally open when flow through the flow-regulating valve is interrupted, and means preventing a flow of fluid through the flow-regulating valve above the normal regulated rate when flow is resumed after interruption.

2. A flow-regulating valve for controlling flow in hydraulic power transmission systems comprising in combination, an adjustable throttle through which fluid is adapted to flow at a normal regulated rate, a pressure compensating valve responsive to the pressure drop across the throttle for maintaining the normal regulated rate and being of the type which is normally open when flow through the flow-regulating valve is interrupted, and means responsive to pressure increases when flow is resumed after interruption for gradually permitting the normal regulated rate of flow of fluid through the flow-regulating valve and preventing flow above the normal regulated rate.

3. A flow-regulating valve for controlling flow in hydraulic power transmission systems comprising in combination, an adjustable throttle through which fluid is adapted to flow at a normal regulated rate, a pressure compensating valve responsive to the pressure drop across the throttle for maintaining the normal regulated rate and being of the type which is normally open when flow through the flow-regulating valve is interrupted, and a resiliently-loaded blocking valve preventing a flow of fluid through the flow-regulating valve above the normal regulated rate when flow is resumed after interruption.

4. A flow-regulating valve for controlling flow in hydraulic power transmission systems comprising in combination, an adjustable throttle through which fluid is adapted to flow at a normal regulated rate, a pressure compensating valve responsive to the pressure drop across the throttle for maintaining the normal regulated rate and being of the type which is normally open when flow through the flow-regulating valve is interrupted, and a resiliently-loaded blocking valve responsive to pressure increases when flow is resumed after interruption for gradually permitting the normal regulated flow of fluid through the flow-regulating valve and preventing flow above the normal regulated rate.

5. A flow-regulating valve for controlling flow in hydraulic power transmission systems having an inlet and an outlet and comprising in combination, an adjustable throttle through which fluid is adapted to flow at a normal regulated rate, a pressure compensating valve responsive to the pressure drop across the throttle for maintaining the normal regulated rate and being of the type which is normally open when flow through the flow-regulating valve is interrupted, and a resiliently-loaded blocking valve beyond the compensating valve responsive to pressure increases at the inlet when flow is resumed after interruption for gradually permitting the normal regulated flow of fluid through the flow-regulating valve and preventing flow above the normal regulated rate.

6. A flow-regulating valve for controlling the flow of fluid in hydraulic power transmission systems comprising in combination, a passage through which fluid is adapted to flow at a normal regulated rate, and in series in said passage an adjustable throttle and a pressure compensating valve responsive to the pressure drop across the throttle for maintaining the normal regulated rate through the throttle and being of the type which is normally open when flow through the passage is interrupted, and means preventing a flow of fluid through the passage above the normal regulated flow rate when flow is resumed in the passage after interruption.

7. A flow-regulating valve for controlling the flow of fluid in hydraulic power transmission systems comprising in combination, a passage through which fluid is adapted to flow at a regulated rate, and in series in said passage an adjustable throttle and a pressure compensating valve responsive to the pressure drop across the throttle for maintaining the regulated rate and being of the type which is normally open when flow through the passage is interrupted, and means responsive to pressure increases when flow is resumed after interruption for gradually permitting the regulated flow of fluid through the passage and preventing flow above normal regulated rate.

8. A flow-regulating valve for controlling the flow of fluid in hydraulic power transmission systems comprising in combination, a passage through which fluid is adapted to flow at a regulated rate, and in series in said passage an adjustable throttle and a pressure compensating valve responsive to the pressure drop across the throttle for maintaining the regulated rate and being of the type which is normally open when flow through the passage is interrupted, and a resiliently-loaded blocking valve preventing a flow of fluid through the passage above the regulated rate when flow is resumed in the passage after interruption.

9. A flow-regulating valve for controlling the flow of fluid in hydraulic power transmission systems comprising in combination, a passage through which fluid is adapted to flow at a regulated rate, and in series in said passage an adjustable throttle and a pressure compensating valve responsive to the pressure drop across the throttle for maintaining the regulated rate and being of the type which is normally open when flow through the passage is interrupted, and a resiliently-loaded blocking valve responsive to pressure increases when flow is resumed after interruption for gradually permitting the regulated flow of fluid through the passage and preventing flow above the regulated rate.

10. A flow-regulating valve for controlling the flow of fluid in hydraulic power transmission systems comprising in combination, a passage having an inlet and an outlet and through which fluid is adapted to flow at a regulated rate, and in series in said passage an adjustable throttle and a pressure compensating valve responsive to the pressure drop across the throttle for maintaining the regulated rate and being of the type which is normally open when flow through the passage is interrupted, and a resiliently-loaded blocking valve beyond the compensating valve responsive to pressure increases at the inlet when flow is resumed after interruption for gradually permitting the regulated flow of fluid through the passage and preventing flow above the regulated rate.

11. In a hydraulic power transmission system containing a fluid pump and motor, a flow regulating valve for controlling the speed of the motor comprising in combination, an adjustable throttle through which fluid is adapted to flow at a regulated rate, a pressure compensating valve responsive to the pressure drop across the throttle for maintaining the regulated rate and being of the type which is normally open when fluid flow through the flow-regulating valve is interrupted, and means preventing a flow of fluid through the flow-regulating valve above the regulated rate when flow is resumed after interruption.

12. In a hydraulic power transmission system containing a fluid pump and motor, a flow-regulating valve for controlling the speed of the motor comprising in combination, an adjustable throttle through which fluid is adapted to flow at a regulated rate, a pressure compensating valve responsive to the pressure drop across the throttle for maintaining the regulated rate and being of the type which is normally open when fluid flow through the flow-regulating valve is interrupted, and means responsive to pressure increases when flow is resumed after interruption for gradually permitting the regulated flow of fluid through the throttle and preventing flow above the regulated rate through said throttle.

13. In a hydraulic power transmission system containing a fluid pump and motor, a flow-regulating valve for controlling the speed of the motor comprising in combination, an adjustable throttle through which fluid is adapted to flow at a regulated rate, a pressure compensating valve responsive to the pressure drop across the throttle for maintaining the regulated rate and being of the type which is normally open when fluid flow through the flow-regulating valve is interrupted, and a resiliently-loaded blocking valve preventing a flow of fluid through the flow-regulating valve above the regulated rate when flow is resumed after interruption.

14. In a hydraulic power transmission system containing a fluid pump and motor, a flow-regulating valve for controlling the speed of the motor comprising in combination, an adjustable throttle through which fluid is adapted to flow at a regulated rate, a pressure compensating valve responsive to the pressure drop across the throttle for maintaining the regulated rate and being of the type which is normally open when fluid flow through the flow-regulating valve is interrupted, and a resiliently-loaded blocking valve responsive to pressure increases when flow is resumed after interruption for gradually permitting the regulated flow of fluid through the flow-regulating valve and preventing flow above the regulated rate.

15. In a hydraulic power transmission system containing a fluid pump and motor, a flow-regulating valve for controlling the speed of the motor having an inlet and an outlet and comprising in combination, an adjustable throttle through which fluid is adapted to flow at a regulated rate, a pressure compensating valve responsive to the pressure drop across the throttle for maintaining the regulated rate and being of the type which is normally open when fluid flow through the flow-regulating valve is interrupted, and a resiliently-loaded blocking valve beyond the compensating valve responsive to pressure increases at the inlet when flow is resumed after interruption for gradually permitting the regulated flow of fluid through the flow-regulating valve, thereby precluding motor jump by preventing a flow of fluid above the regulated rate when flow is resumed after interruption.

16. A self-contained flow-regulating valve for controlling flow in hydraulic power circuits capable of gradually restarting flow through said valve after flow interruption therethrough comprising in combination, a unitary body having a single inlet and a single outlet adapted to be connected in series in a circuit line, an adjustable throttle and a compensating valve in series between the inlet and the outlet, the compensating valve assuming various regulating positions in response to the pressure drop across the throttle to maintain the pressure drop substantially constant and being normally biased to a non-regulating position while flow to the inlet is interrupted, and means for temporarily restricting flow through the flow-regulating valve when flow is resumed after interruption until the compensating valve assumes a regulating position.

17. A self-contained flow-regulating valve for controlling flow in hydraulic power circuits capable of gradually restarting flow through said valve after flow interruption therethrough comprising a unitary body having a flow-governing passage provided with an inlet and an outlet and arranged to be connected in series in a circuit line, an adjustable throttle and a compensating valve in series between the inlet and the outlet, the compensating valve assuming various regulating positions in response to the pressure drop across the throttle to maintain the pressure drop substantially constant and being normally biased to a non-regulating position while flow to the inlet is interrupted, and means for temporarily restricting flow through the flow-regulating valve when flow is resumed after interruption until the compensating valve assumes a regulating position.

DUNCAN B. GARDINER.

REFERENCES CITED

The following references are of record in the file of this patent:

UNITED STATES PATENTS

| Number | Name | Date |
|---|---|---|
| 1,985,443 | Clute | Dec. 25, 1934 |
| 2,166,940 | Conradson | July 25, 1939 |

FOREIGN PATENTS

| Number | Country | Date |
|---|---|---|
| 373,732 | Great Britain | June 2, 1932 |